Patented Oct. 13, 1942

2,298,269

UNITED STATES PATENT OFFICE 2,298,269

SYNTHETIC PROTEIN RESIN AND METHOD OF MAKING THE SAME

Francis Clarke Atwood, Newton, Mass., assignor to Atlantic Research Associates, Inc., Newtonville, Mass., a corporation of Delaware No Drawing. Application May 14, 1937, Serial No. 142,574

13 Claims. (Cl. 260—6)

In general the invention has for its object the resinification of proteins to form novel and useful compounds or complexes of a resinous nature and also to provide novel and practical methods of making the same.

A further object of the invention is to provide novel protein compounds in which a reagent is incorporated in the compound in such a manner as to react with the protein to form a synthetic protein resin and in which the reagent is permanently associated or combined with the protein as a salt or ester to produce a highly desirable and superior protein complex.

A further object of the invention is to provide a means of satisfying the active double bonds, free amino and carboxyl groups of the complex casein molecule with compounds which toughen, plasticize, and otherwise benefit the resinous product so formed from casein in a stable manner.

A still further object of the invention is to provide novel coating compositions embodying the novel protein compounds, some of which may be used in the manufacture of protein films or sheets, paper coating compositions, paint compositions or other compositions with color-carrying value.

With these general objects in view and such others as may hereinafter appear, the invention consists in novel protein compounds and coating compositions and also in the methods of producing the same hereinafter described and particularly defined in the claims at the end of the specification.

The present invention contemplates the production of novel protein products produced by reaction with proteins of certain reagents selected from the group comprising polyatomic alcohols, polyoses such as carbohydrates, organic acids, salts, soaps and bases, and among the proteins which I have found suitable for the production of the improved protein products are casein, both derived from animal sources and from vegetable sources, such as milk and soya bean caseins together with peanut meal protein, linseed meal protein, and glues, gelatins and albumins. For purposes of illustration the invention will be described in connection with the production of improved protein products utilizing milk casein as the base.

Milk casein is commonly known to be a complex protein of the type known as conjugated proteins. Its complete chemistry and the nature of its molecular structure is still practically unknown. From the fact that it contains a substantial percentage of phosphorus, it is considered to be a phospho protein or an ester of phosphoric acid. The fact that when broken down and analyzed a large number of amino acids may be identified and separated indicates that the casein molecule itself is a complex system of conjugated amino acids. These amino acids may unite with each other and form larger aggregates which in turn may again unite with each other to form still larger complexes. This building up probably continues until the ordinary casein molecule of commerce is formed. The protein molecule and the amino acids themselves are characterized by their amphoteric properties; that is, they can act as a base by virtue of their amino group and as an acid by virtue of their carboxyl group. At present in nearly all the reactions in which casein is used commercially, it may be considered to be an acid and the reactions which take place are limited mostly to those with inorganic alkalies and their salts with weak inorganic acids.

Pure casein itself is insoluble in water and inorganic alkalies or alkaline salts are used ordinarily to dissolve the casein because the salt formed is soluble at least so far as normal alkalies or alkaline salts are concerned. In commercial practice and in the present state of the art only the simple inorganic alkalies and alkaline salts of weak acids have been used to dissolve the casein. The casein is apparently a strong enough acid to replace certain of the acids like carbonic acid, so that the carbonates of soda and potash, caustic soda, caustic potash, ammonia, and certain salts like borax and the sodium phosphates will dissolve casein. Nearly all of these solutions of casein, however, which result from solution thereof with an alkali, even a weak alkali, tend to hydrolyze the casein breaking down or causing cleavage of the complex molecule into the simpler amino acid groups. These chaotically hydrolyzed or proteolytically dissociated groups are not desirable nor useful in the products with which I am now concerned. In my prior U. S. Patent No. 1,893,608 I have disclosed stable casein solutions characterized by their ability to withstand uncontrolled hydrolytic dissociation of the complex molecule and at the same time to withstand cleavage due to the growth of certain kinds of microorganisms. In my present invention I prefer to take advantage of certain methods of preparation described therein, but I have made certain new and useful improvements and at the same time have produced products which are resinified compositions of casein and like proteins whose structure cannot be defined at this time, but whose properties identify them as being different from compounds of casein heretofore produced.

One group of the present resinified products may be considered perhaps as esters formed by the inter-action of polybasic acids with polyatomic alcohols. The polybasic acid, in this case for mechanistic purposes, may be considered simply as the large aggregate of amino acids combined or polymerized to form casein or other proteins. The proteins are so complex that their degree of combining power is not definitely known. Many investigators, however, consider that casein has a valence of eight and I have discovered that since any or all of the active valences may be satisfied at any one time, casein has all the essential characteristics of a polybasic acid necessary to yield interesting and useful resin-like materials when combined with polyatomic alcohols and other compounds hereinafter described.

I have selected glycerine as the principal polyatomic alcohol for illustrative purposes although the glycols and other polyatomic alcohols may be used to advantage. I am aware that glycerine has been used in casein solutions from time to time in an attempt to increase the plasticity of the casein. Such results have met with failure I belive because the glycerine is simply added or mixed with the solution of caseing forming a heterogeneous mixture in which no reaction has taken place. Consequently the glycerine exists in the finished product in its natural state and may be removed from the product by absorbent materials or such as may remain retains its hygroscopic nature and attracts moisture causing tackiness and other usual disadvantageous results. Certain proteins like stabilized gelatin appear to act a little more favorably in their mixture with glycerine but even with these products I have found that no reaction appears to have taken place in the ordinary gelatin or glue-glycerine combinations and I have found in my work that by a suitable treatment not only casein but glue and particularly stabilized animal proteins as well as other complicated proteins may be caused to yield products compounded with glycerine which are different from ordinary solutions or mixtures of the protein with glycerine.

I have also discovered that in the solutions in which I have caused a complex protein to react with glycerine I may also introduce fatty acids or polybasic acids in such a way that the final result apparently is a complex combination of the glycerine or glycol or other polyatomic alcohol with two or more mono or polybasic acids, one of which at least is the casein or similar acid protein. In this way I am able to obtain the water-dispersible or other desired characteristics of the protein modified by certain other desired characteristics of the fatty acids or similar combinations. As an example, if I make a casein-glycerine combination and cook into it the fatty acids of linseed or other drying oils I obtain a product which has substantial water-resistant properties when dry, together with certain other desirable plastic and viscous qualities which render the new product suitable for use as a paint vehicle or other film forming material.

The above described combination of protein-glycerine and fatty acids is not to be confused with an emulsion of oil in the protein solution. The two types of products are very different in their behavior for whereas one solution is strictly an emulsion, the result I have obtained is a novel chemical product of increased utility and high stability. For example, it may be considered in my products that at least one of the hydroxyl groups of the glycerine has been replaced by the casein group while one of the other hydroxyl groups has been replaced by a fatty acid group, whereas in the prior art emulsions an oil such as the triglycerides of oleic, linoleic and other fatty acids contain no active group with which the casein can combine and the result is a mere mechanical mixture or emulsion of the casein and glyceride subject to separation by freezing.

It is necessary in the formation of the products I have described to use an elevated temperature and/or certain agents which appear to act as catalysts for the esterifying or like reaction. I have found that an elevated temperature and a more or less prolonged heating at this temperature is ordinarily preferred. In a general way, my practice is similar to that described in my above mentioned patent as I find it useful to solvate the mass without breaking up the particles of protein or casein in any way. This swelling or expansion of the protein molecule is probably accompanied by hydration. The hydrated protein particle is acted on by a catalyst of some type such as the alkali, ammonium or amine fluorides, stannates, thiocyanates, lactates, naphthenates, and preferably the formates, benzoates and furoates, all of which prevent or control the hydrolytic cleavage of the casein molecule.

When the casein or protein has been suitably prepared by hydrating or by action of the catalyst the polyhydric alcohol is introduced in amounts corresponding to the degree of plasticity or other properties desired in the final product. The two reactions of solvation together with plasticization may be more or less simultaneous although smaller amounts of the catalyst are used when the reaction occurs in steps. I have used up to an amount of glycerine equal or greater than the corresponding weight of casein in the solution. The resulting product is very flexible and stretches although it has a tendency to easily deform and go past its elastic limit. Such a film, however, containing a high percentage of glycerine does not sweat nor attract moisture nor act as one would normally expect a film to act containing such a high percentage of hygroscopic polyatomic alcohol. If the viscosity of the product so obtained in water solution is too great for certain purposes, I may lower the viscosity by using a simple alcohol like ethyl alcohol or an anti-foaming alcohol such as butyl alcohol and the like as described and claimed in my copending application Serial No. 442,997, filed April 9, 1930. In addition, the solution may be thinned by adding traces of ammonia or any other common alkali. If a relatively small amount of polyatomic alcohol is to be used, it may be necessary for most practical purposes to use a small amount of alkaline material as an aid for dispersing the resinified casein. This, however, is not true of proteins like glue or gelatin. The amount of alkali or essentially neutral alkaline material, e. g., soap, required to give a definite viscosity of the solution with casein is much less when the casein has been resinified with glycerine, or other materials, as above or hereinafter described than required when unresinified casein is employed. The necessary amount of alkali, amine, salts, soap, etc., varies inversely with the proportion of polyatomic alcohol used to react with the casein and should be added to the casein after resinification. Some of the salts or soaps and particularly the amine salts such as triethanolamine formate, benzoate and furoate not only act as solvating, catalytic and dispersing agents, but in addition act as toughening, plasticizing and active resinifying agents.

I have further discovered that in the absence or presence of catalysts used to assist in the speed of reaction and dispersion, it is often advantageous to react the final dispersing alkaline or organic base material with a fatty acid or other organic acid and form a soap or salt prior to its use as dispersing agent or further resinifying component in the casein suspension. I have found that by following this procedure smaller amounts of either material are required to obtain the final resinification, dispersion or solution of the casein.

Having thus described my invention, the following examples describing various type resin products included in my invention will serve for illustrative purposes.

I. POLYATOMIC ALCOHOL RESINS

Example 1

| | Parts |
|---|---|
| Casein | 10 |
| Glycerine | 2.5 |
| Water | 50 |
| Borax | 1.5 |

In this example the casein, glycerine and water are heated together at 160° F. for about 2 hours. The resinified casein is then dispersed by the addition of the borax. This composition may be used advantageously as a vehicle for paints, films, etc.

Example 2

| | Parts |
|---|---|
| Casein | 10 |
| Diethyleneglycol | 2.5 |
| Water | 50 |
| Pine oil | 1 |
| Sodium formate | 1 |
| Sodium oleate | 1 |

In this example the casein, diethyleneglycol, water, pine oil and sodium formate are heated together for about 2-3 hours at a temperature of about 160°-170° F. The resinified protein is then dispersed by addition of the soap and serves as an excellent vehicle for paint and the like.

II. POLYOSE RESINS

Example 3

| | Parts |
|---|---|
| Casein | 10 |
| Lactose | 10 |
| Water | 50 |
| Triethanolamine recinoleate | 4 |

In this example the casein, lactose and water are heated for about 2 hours at 160° F. The triethanolamine ricinoleate composition prepared by reacting 1 part of triethanolamine with 3 parts of ricinoleic acid is next added to the resinified casein and the complete mixture subjected to 180° F. for approximately 2 hours. This composition makes an excellent vehicle for a coating composition.

Example 4

| | Parts |
|---|---|
| Casein | 10 |
| Sucrose | 10 |
| Water | 40 |
| Triethanolamine formate | 1.5 |

In this example the complete mixture is heated with steam in an autoclave for 0.5 to 1.0 hour at about 5 to 10 pounds pressure. This vehicle may also be used in coating compositions and like compositions.

III. ORGANIC ACID RESIN

Example 5

| | Parts |
|---|---|
| Casein | 10 |
| Soya fatty acids | 2 |
| Water | 50 |
| Sodium formate | 1 |
| Triethanolamine | 1.5 |

In this example the casein, fatty acids, water and formate are heated at about 100°-120° F. for about 10-12 hours. The triethanolamine is then added and the mixture subjected to sufficient agitation to give good dispersion. The dispersed resinified protein is particularly adapted for use in casting transparent protein films and the like.

Example 6

| | Parts |
|---|---|
| Casein | 200 |
| Water | 1,000 |
| Triethanolamine-sulphurized sesame fatty acid soap | 61 |

In this example 40 parts of fatty acid is first vulcanized with about 1 part of sulphur at 300° F. and then saponified with 20 parts of triethanolamine by heating at 140° F. for about 0.5 hour. The saponified sulfurized fatty acid is then mixed with the casein and water and subjected to further heat for 1 hour at about 190°-210° F. to complete resinification. This composition forms an excellent base for protein sheets, coating films, and the like.

Example 7

| | Parts |
|---|---|
| Casein | 100 |
| Oleic acid | 50 |

In this example the casein and acid are thoroughly mixed and heated for about 2 hours at approximately 160° to 180° F. The final product a resinous mass, is useful for molding compositions or may be dispersed by alkaline or essentially neutral materials to form a base for coating compositions, including wall paper coatings and the like.

IV. ORGANIC SALT, SOAP, and BASE RESINS

Example 8

| | Parts |
|---|---|
| Casein | 10 |
| Ammonium oxalate | 0.2 |
| Water | 50 |
| Triethanolamine oleate | 3 |

In this example the casein, oxalate and water are first heated for 1 hour at 160° F. The fatty acid soap prepared by reacting 1 part triethanolamine with 2 parts oleic acid is then added and the final composition heated at 160° F. for 2-3 hours. The dispersed resinified casein is particularly adapted for use in the manufacturing of tough, transparent casein films.

Example 9

| | Parts |
|---|---|
| Casein | 100 |
| Butylamine stearate | 25 |
| Water | 500 |

In this example the casein, soap and water are heated for 2 hours at about 160° to 165° F. The final cooled product is a paste readily dispersible in water and forms a good vehicle for coating compositions.

Example 10

| | Parts |
|---|---|
| Casein | 100 |
| Pyridine | 15 |
| Water | 15 |

In this example the materials are mixed in a Bambury mixed for 0.5 to 1 hour. The reaction or resinification takes place under the pressure and heat generated in the mixer and the final product is a hard, tough resin which can be made into satisfactory molded articles. Fillers such as diatomaceous earth, wood flour, mica and the like may be used as desired. This resin may also be cast at elevated temperatures due to the unusual fluidity imparted to the casein by this type of base or dispersing agent.

V. MIXED RESINS

Example 11

| | Parts |
|---|---|
| Casein | 10 |
| Glycerine | 1 |
| Linseed acids | 1 |
| Phthalic acid | 1 |
| Sodium fluoride | 1 |
| Triethanolamine | 1.5 |
| Water | 50 |

In the above example the casein, glycerine, linseed and phthalic acids and catalyst are heated at about 100°–110° F. for approximately 12–14 hours. The triethanolamine, or other amine and preferably an hydroxy amine, is then added to facilitate complete dispersion. The dispersed resinified protein may be used to advantage as a vehicle for paint, other coating compositions and the like.

Example 12

| | Parts |
|---|---|
| Casein | 100 |
| Glycerine | 10 |
| Tartaric acid | 20 |
| Water | 500 |

In this example the casein, glycerine, tartaric acid and water are heated in the usual manner for about 2 hours at a temperature of over 150° F. and preferably at a temperature of approximately 160° F.

PAINT

Example 13

| | Parts |
|---|---|
| Vehicle: | |
|     Casein | 100 |
|     Water | 500 |
|     Pine oil | 8 |
|     Soya fatty acids | 12 |
|     Sodium formate | 10 |
|     Borax | 10 |

In this example the casein and water are first heated at about 140° F. to swell the casein and then the pine oil, fatty acids and formate are added to the swollen mixture. The mixture is next heated at 160° F. for about 2 hours and then the borax is added with continued heating and stirring at about 160° F. for about 1 hour. The dispersion is then cooled and may serve as a paint vehicle as follows Paint:

| | Parts |
|---|---|
|     Casein vehicle | 300 |
|     Lithopone | 350 |
|     Asbestine | 100 |
|     Mica | 50 |

The resinified stabilized casein vehicle prepared as above is thoroughly mixed with the mineral pigments and is ready for immediate use. Water or other diluent may be added to bring the final product to the desired painting consistency.

FILM

Example 14

| | Parts |
|---|---|
| Casein | 25 |
| Water | 125 |
| Triethanolamine, sesame fatty acid composition | 10 |
| Formaldehyde | 1 |

In this example the casein and water are heated at 110° F. in order to swell the casein. The amine-fatty acid composition prepared by partially saponifying 45 parts of sesame fatty acids with 20 parts triethanolamine is then added to the swollen casein. The complete mixture is next heated to 160° F. for about 2 hours and then finally subjected to a temperature of 180° F. for 1 hour. The resinified mixture is mixed with the formaldehyde just before casting the films in the ordinary manner. The resulting films or sheets are tough, flexible and retain their transparency for long periods of time.

SPECIAL RESIN

Example 15

| | Parts |
|---|---|
| Casein | 100 |
| Acrylic acid | 15 |
| Triethanolamine | 30 |
| Water | 500 |

In this example all of the ingredients are heated together for 1 to 3 hours at about 160°–175° F. The final resinified product is highly desirable for use when a plastic, tough film or sheet is required. In place of casein other proteins such as soya protein may be used to advantage in the above example. Also, in place of acrylic acid other unsaturated organic acids or substituted acrylic acids, e. g., methacrylic acid, may be employed.

It will be understood that in place of the glycerine and glycols employed in the above examples, other polyhydric or polyatomic alcohols such as arabitol, the various higher alcohols of the terpine series and the like may be used to form my improved protein resins.

It will also be understood that in place of lactose and sucrose other polyoses including carbohydrates, gums and mucilages such as maltose, dextrose, glucose, arabinose, carrageen (Irish moss) may be employed in the above examples. My investigations show that all polyhydroxy carbon compounds react with the active resinifying groups in the protein molecule. My investigations also show that polyoses such as lactose form lactides which react readily with proteins such as casein at elevated temperatures.

In place of the various acids employed in the above examples my invention includes the use of linoleic, stearic, palmitic, and lauric acids and the acids derived from butter fats present in buttermilk casein, or from lard, perilla, cocoanut, olive, peanut, cottonseed, fish, sunflower, safflower, China-wood, corn, linseed, mustard, rape and castor oils as well as acids derived from pentoses, hexoses, and other polyoses. In practice a mixture of various acids and particularly fatty acids is often preferred. In addition oxalic, lactic, benzoic, mucic, maleic, abietic, carraghenic, arabic acids and even acetic acid may be used to advantage in certain type protein resins. My invention also includes the use of other vulcanized or sulphurized unsaturated fatty acids such as linoleic, sesame, tea seed, olive oil acids, etc., together with various heat bodied, air blown, polymerized or condensed acids derived from various oils.

Various salts of the organic acids may be employed in the resinification although I prefer to use ammonium or substituted ammonium, i. e., amine, salts. The soaps adaptable for use in my invention include the various alkali, ammonium and amine soaps, with the amine and particularly the hydroxy amine, i. e., ethanolamine, butanolamine, etc., being preferred. The various organic bases adaptable for use in my invention include all types with the amines, i. e., methyl, ethyl, propyl, etc., being preferred. Heterocyclic bases such as pyridine form particularly good molding resins with casein. Alkali soaps of synthetic complex resins such as the malicabietic and oleicabietic complexes may also be employed to form stable protein resins having desired properties.

My investigations have proven that proteins such as casein are capable of forming various resinous products of definite composition possessing varied although highly desirable properties. The resins made from the various reacting ingredients all have different properties making some products adaptable for certain applications such as protein paint vehicles while others possess other properties making them particularly adaptable for use, for example, in the manufacturing of transparent wrapping film. The properties of the resins not only vary when the various reacting ingredients such as polyatomic alcohols, polyoses, organic acids etc. are used, but the properties of the resinified products also vary depending on the type of protein employed. For example, the fatty acid-soya protein resins all possess advantageous properties but the ricinoleic acid-soya bean protein resin is much preferred over the others including the oleic acid-soya bean protein resin.

As previously pointed out above, the present invention does not include emulsions of protein and oil nor does the present invention include emulsions or mixtures of casein and uncombined preformed synthetic resins. The present invention, on the contrary, is limited to protein resins in which the active resinifying groups of the complex protein molecule are chemically combined with the active groups of the various reacting ingredients. For example, when undertaking my investigation of protein resins I found that mixtures of casein and locust bean gum separated out on standing. However, I discovered that on heating the casein-gum mixture for about 2 hours at 160° F. a resinified product resulted which was free from separation. The final product in addition did not merely have the combined properties of casein and locust bean gum, but exhibited new, unexpected and improved properties not possessed by either the casein or gun or mixtures of the same.

Although I prefer to use caseins including both milk casein and soya casein, the other proteins including corn, wheat, rye, hemp, fibrin and the like react in a manner similar to above examples yielding, however, resinified products having varied properties.

In incorporating the various acids and amine-acid compositions into the protein molecule it will be noticed that the amount of amine employed is ordinarily insufficient to completely saponify the acid component. The amine-acid composition contains free carboxyl groups which readily react with the active groups in the protein or casein molecule at elevated temperatures yielding the improved resinified products. While various alkali metal and ammonium soap combinations may be employed, I have discovered that the amine and particularly the hydroxy amine compositions yield products having greatly improved properties.

I have discovered that protein resins in which the stabilizing catalysts such as the formates, thiocyanates, benzoates, fluorides, etc. are employed are as a general rule much preferred over the other compositions in which the stabilizing plasticizing agents are not employed. My protein resins are, however, stable products and are suitable for various industrial application with or without the addition of the stabilizing salts. The formate, benzoate and furoate salts as previously pointed out above are often incorporated because they not only catalyze and assist in the formation and stabilizing of the resinified products, but in addition actively plasticize and toughen the resin products.

It will also be understood by those familiar with the present art that while many of the above mentioned resinified products are used for fabrication of articles of manufacture which are to be dried, and while such dry powdered products may be useful as such or later dispersed again, I frequently want to use these casein resins in water dispersions which will be stable and have uniform viscosity over long periods of time. If the pH value of the dispersion is very low or high, it indicates a large excess of acid or alkali has been used which tends on long standing to hydrolyze the resin. I prefer therefore in such cases where stable and uniformly viscous dispersions are required, to utilize a catalyzed resin and maintain a pH value in the dispersion of not less than 2 nor more than 9 depending on whether acid or alkaline materials have been used to produce the final dispersion. In many of my dispersions containing my resinified protein products I prefer to maintain the pH value between 4.6 (the isoelectric point of casein) and 9, the approximate end point for the indicator cresol red. When operating on the other or acid side of the isoelectric point I prefer to stay above a pH value of 2, the end point of the indicator methyl violet. When using other proteins than casein the isoelectric point varies somewhat and will necessitate a corresponding adjustment.

In many cases where it is desired to prevent the formation of certain odors, or the embrittlement of the finished film, paint, or other product, I have found it useful and desirable to incorporate in my compositions so-called antioxidants. I have discovered that the following products and classes of products are useful for this purpose. Weak reducing agents which prevent oxidation of the double bonds of casein or fatty acid may be obtained from the group useful as photographic developers such as pyrogallol, hydroquinol, resorcinol, and the like. Reducing and bleaching dispersion agents like sodium sulphite and the stannite salts as well as the stannous fatty acid soaps, i. e., stannous oleate, may also be used. In addition, weak reducing amines such as diphenylamine and the like may be used, although the non-odorous phenolic antioxidants, many of which actively enter into the resinifying reaction, are preferred. The reducing and bleaching effect prevents yellowing of the finished product with age, and gives products of other desired improved properties.

It will be understood by those skilled in the art that while I have illustrated my invention with specific examples employing certain specified proportions of ingredients together with certain preferred temperatures that my invention is not limited thereto. The proportion of ingredients and heating temperatures may, of course, be varied in order to produce protein resins having the desired characteristics. My invention is also not limited to the specific materials described in the illustrative examples, as my invention includes all equivalent materials and particularly those set forth in the above specification.

I claim:

1. A stable water-dispersible hydrated casein-straight chain alkyl amine higher fatty acid soap resin.
2. A stable water-dispersible hydrated casein-straight chain hydroxy alkyl amine higher fatty acid soap resin.
3. A stable water-dispersible hydrated casein-triethanolamine higher fatty acid soap resin.
4. A stable water-dispersible hydrated casein-triethanolamine sesame fatty acid soap resin.
5. A stable water-dispersible polyhydric alcohol modified hydrated casein-straight chain alkyl amine higher fatty acid soap resin.
6. A stable water-dispersible glycerin modified hydrated casein-straight chain hydroxy alkyl amine higher fatty acid soap resin.
7. A stable water-dispersible higher fatty acid modified hydrated casein-straight chain alkyl amine higher fatty acid soap resin.
8. A stable water-dispersible hydrated casein-partially saponified straight chain hydroxy alkyl amine higher fatty acid soap resin.
9. A stable formaldehyde hardened water-dispersible hydrated casein-triethanolamine higher fatty acid soap resin.
10. A stable aqueous dispersion having a pH value of 2–9 and having therein a water-dispersible hydrated casein-straight chain alkyl amine higher acid soap resin.
11. A stable aqueous dispersion having a pH value of 4.6–9 and having therein a water-dispersible hydrated casein-triethanolamine higher fatty acid soap resin.
12. A stable aqueous dispersion having a pH value of 2–4.6 and having therein a water-dispersible hydrated casein-partially saponified triethanolamine higher fatty acid soap resin.
13. A method of forming a stable water-dispersible resinified protein composition which comprises reacting hydrated casein and a straight chain alkyl amine-higher fatty acid soap in an aqueous medium at a temperature above 160° F.

FRANCIS CLARKE ATWOOD.

CERTIFICATE OF CORRECTION.

Patent No. 2,298,269.  October 13, 1942.

FRANCIS CLARKE ATWOOD.

It is hereby certified that error appears in the printed specification of the above numbered patent requiring correction as follows: Page 2, first column, line 31, for "caseing" read --casein--; page 3, first column, line 59, for "recinoleate" read --ricinoleate--; page 5, first column, line 66, for "gun" read --gum--; page 6, second column, line 18, claim 10, after "higher" insert --fatty--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.